3,236,852
ESTERS OF 6-METHYL- AND 1,6-DIMETHYL-ERGOLINE I
Luigi Bernardi and Onofrio Goffredo, Milan, Italy, assignors to Società Farmaceutici Italia, Milan, Italy, a corporation of Italy
No Drawing. Filed July 23, 1963, Ser. No. 296,930
Claims priority, application Italy, July 26, 1962, 150,652/62
9 Claims. (Cl. 260—285.5)

Our invention relates to therapeutically useful derivatives of 6-methyl- and 1,6-dimethyl-8-hydroxymethyl-ergoline I and to the process of preparing them.

We have now found that some esters of 6-methyl- and 1,6-dimethyl-8-hydroxymethyl-ergoline I of the formula

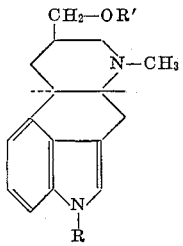

wherein R is hydrogen or methyl and R' represents the radical of an aliphatic, cycloaliphatic, aromatic or heterocyclic acid having from 3 to 10 carbon atoms, show a high oxytocic, antienteraminic, adrenolytic, hypotensive and sedative activity both in vivo and in vitro, and a very low toxicity.

6-methyl- and 1,6-dimethyl-8-hydroxymethyl-ergoline I, which are called also dihydro-lysergol I and 1-methyl-dihydro-lysergol I, constitute the starting products of the process of the present invention, may be either D- or L-form or the racemic mixture, and may be prepared according to the method described by Jacobs and Craig, Journ. Biol. Chem. 108 (1935), page 595, or according to Stoll et al., Helv. Chim. Acta 32 (1949), pages 1947. The process described by Jacobs and Craig consists in the reduction with sodium and a lower aliphatic alcohol of secale cornutum alkaloids such as ergotinine, while the process described by Stoll et al. consists in the reduction with lithium aluminum hydride of an ester of dihydro-lysergic acid. Stoll et al. also describe the preparation and the chemical-physical characteristics of the dihydro-lysergol I acetate. Neither publication, however, mentions the pharmacological properties of dihydro-lysergol I or of its acetate.

The process of the present invention essentially consists in the esterification of dihydro-lysergol I and 1-methyl-dihydro-lysergol I with an acylating agent selected from the group consisting of the anhydride or the chloride of an organic aliphatic, cycloaliphatic, aromatic and heterocyclic acid having from 3 to 10 carbon atoms, in the optional presence of a tertiary amine, such as pyridine, diethylaniline, triethylamine and the analogues.

Typical examples of acyl derivatives, prepared according to our invention, are the following acids: propionic, butyric, heptanoic, benzoic, ethylcarbamic, butylcarbamic, nicotinic, isonicotinic and the analogues.

The products of the present invention are crystalline, colorless or yellowish solids, soluble in the usual organic solvents and in acids. They show a good oxytocic, antienteraminic, adrenolytic, hypotensive, sedative activity, and a low toxicity. In human therapy they can be administered orally, intramuscularly, and subcutaneously as well as intravenously, and are particularly useful in internal medicine (migraine, cephalea, nervous tachycardia, atony of the stomach, hyperthyroidism, Basedow disease, trigeminal neuralgia, peripherical vascular diseases) and in obstetrics and gynecology (metrorrhage, puerperium, curettage, abortion, pregnancy toxemia, uterine atonia).

The clinical doses for human beings range from 0.1 to 5 mg. per day of active compound according to the case. The therapeutic compositions, as usually employed, include one or more compounds of the present invention with a certain amount of solid or liquid vehicle. Suitable compositions for oral administration may be, for example, tables, powders, pills, etc. Starch, lactose, talc magnesium stearate and analogues are suitable excipients.

The following examples serve to illustrate, but not to limit, the present invention.

EXAMPLE 1

*Dihydro-lysergol I benzoate*

To 0.410 g. of dihydro-lysergol I in 15 cc. of anhydrous pyridine, 1 cc. of benzoyl chloride is added at room temperature, and the mixture is stirred for 30 minutes. 1 cc. of water and some drops of methanol are added to the reaction mixture, and after one hour under stirring, the reaction mixture is evaporated in vacuo to dryness. The residue is dissolved in chloroform, the solution washed with dilute sodium hydroxide, with water, and then dried over anhydrous sodium sulfate and evaporated in vacuo to dryness. The residue is recrystallized from a small quantity of methanol and yields 0.480 g. of dihydro-lysergol I benzoate, melting at 247–249° C.;

$[\alpha]_D^{20} = -79°$ (c.=0.42 in pyridine).

EXAMPLE 2

*Dihydro-lysergol I nicotinate*

The preparation is carried out in the same way as in Example 1, but employing the nicotinic acid chloride hydrochloride as acylating agent. Dihydro-lysergol I nicotinate, melting at 225–226° C., is obtained;

$[\alpha]_D^{20} = -87°$ (c.=0.44 in pyridine).

EXAMPLE 3

*Dihydro-lysergol I N-butylcarbamate*

To a solution of 0.4 g. of dihydro-lysergol I in 20 cc. of anhydrous pyridine, 0.8 cc. of butyl isocyanate are added and the mixture heated for 8 hours to 100° C. After cooling to room temperature, the mixture is allowed to stand overnight after addition of 1 cc. of water, and then evaporated in vacuo to dryness. The residue is taken up with chloroform and the solution obtained is thoroughly extracted with dilute tartaric acid. The aqueous acid extract made alkaline with dilute sodium hydroxide is extracted with chloroform. The chloroform extracts are successively washed with a 5% solution of sodium bicarbonate and with water and then dried over anhydrous sodium sulfate, and evaporated in vacuo to dryness. After recrystallization from ethyl ether-petroleum ether, the residue yields 0.380 g. of dihydro-lysergol I 8-N-butylcarbamate, melting at 166–167° C;

$[\alpha]_D^{20} = -79°$ (c.=0.47 in pyridine).

EXAMPLE 4

*1-methyl-dihydro-lysergol I*

This compound may be prepared according to a known method, consisting of the methylation in 1-position of dihydro-lysergol I with methyl iodide in liquid ammonia and in the presence of metal potassium, or according to the general method of Stoll et al. (Helv. Chim. Acta 32 (1949), page 1947), consisting of the reduction with lithium aluminum hydride of an ester of 1-methyl-dihydrolysergic acid. In both cases 1-methyl-dihydro-lysergol I, melting at 243–246° C. (with dec.), is obtained;

$[\alpha]_D^{20} = -98°$ (c.=0.45 in pyridine).

EXAMPLE 5

*1-methyl-dihydro-lysergol I propionate*

The preparation is carried out as in Example 1, but employing 1-methyl-dihydro-lysergol I and the propionic acid anhydride as acylating agent. 1-methyl-dihydro-lysergol I propionate, melting at 94–95° C., is obtained.

$[\alpha]_D^{20} = -85°$ (c.=0.5 in pyridine).

EXAMPLE 6

*1-methyl-dihydro-lysergol I benzoate*

The preparation is carried out as in Example 1, but employing 1-methyl-dihydro-lysergol I in lieu of dihydro-lysergol I. 1-methyl-dihydro-lysergol I benzoate, melting at 141–143° C., is obtained.

$[\alpha]_D^{20} = -89°$ (c.=0.39 in pyridine).

EXAMPLE 7

*1-methyl-dihydro-lysergol I nicotinate*

The preparation is carried out as in Example 2, but employing 1-methyl-dihydro-lysergol I in lieu of dihydro-lysergol I. 1-methyl-dihydro-lysergol I nicotinate, melting at 142–144° C., is obtained.

$[\alpha]_D^{20} = -88°$ (c.=0.51 in pyridine).

EXAMPLE 8

*1-methyl-dihydro-lysergol I N-ethylcarbamate*

The preparation is carried out as in Example 3, but employing 1-methyl-dihydro-lysergol I in lieu of dihydro-lysergol I and ethyl isocyanate instead of butyl isocyanate. 1-methyl-dihydro-lysergol I N-ethylcarbamate, melting at 158–160° C., is obtained.

$[\alpha]_D^{20} = -84°$ (c.=0.6 in pyridine).

EXAMPLE 9

*1-methyl-dihydro-lysergol I N-diethylcarbamate*

3.2 g. of 1-methyl-dihydro-lysergol I dissolved in 96 cc. of pyridine, are treated at 0° C. with 2.6 g. of p-nitrophenyl chlorocarbonate. The mixture is left for 2 hours at room temperature, is heated for 15 minutes to 60° C., and evaporated in vacuo to dryness. The residue, taken up with a small quantity of methanol, yields 3.9 g. of a yellowish crystalline product melting at 228–230° C., which consists of the mixed carbonate of 1-methyl-dihydro-lysergol I and of p-nitrophenol.

1 g. of this mixed carbonate, dissolved in 10 cc. of chloroform and 10 cc. of anhydrous methanol, is treated in the cold with 20 cc. of 18% methanolic diethylamin solution. The mixture is stood overnight and then evaporated in vacuo to dryness. The residue is taken up with dilute hydrochloric acid and extracted with ether. The acidic aqueous layer is made alkaline and extracted again with chloroform after evaporation of the solvent and further crystallisation from benzene, 1-methyl-dihydro-lysergol I N-diethylcarbamate is isolated as its monobasic tartrate, melting at 152°–154° C. is obtained.

We claim:
1. A compound of the formula:

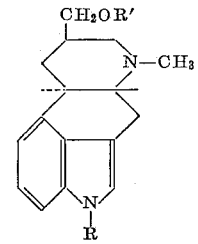

wherein
R is selected from the group consisting of hydrogen and methyl
R' is an acyl group selected from the group consisting of propionic, butyric, benzoic, nicotinic and isonicotinic acids, lower alkyl substituted and unsubstituted carbamic acid, wherein the substituent is alkyl of up to 4 carbon atoms.
2. Dihydro-lysergol I benzoate.
3. Dihydro-lysergol I nicotinate.
4. Dihydro-lysergol I N-butylcarbamate.
5. 1-methyl-dihydro-lysergol I propionate.
6. 1-methyl-dihydro-lysergol I benzoate.
7. 1-methyl-dihydro-lysergol I nicotinate.
8. 1-methyl-dihydro-lysergol I N-ethylcarbamate.
9. 1-methyl-dihydro-lysergol I N-diethylcarbamate

References Cited by the Examiner

UNITED STATES PATENTS

| | | | |
|---|---|---|---|
| 2,995,567 | 8/1961 | Sarett et al. | 260—319 |
| 3,078,214 | 1/1963 | Hofmann et al. | 260—319 |
| 3,113,133 | 12/1963 | Hofmann et al. | 260—285.5 |

OTHER REFERENCES

Burger, Medicinal Chemistry, pp. 585–6 and 622 (1960).

Schreier, Helv. Chim. Acta, vol. 41, pp. 1984–97 (1958).

Stoll et al., Helv. Chim. Acta, vol. 32, pp. 1947–56 (1949), p. 1954 relied on.

Stoll et al., Helv. Chim. Acta, vol. 36, pp. 1512–1526 (1953).

IRVING MARCUS, *Primary Examiner.*

NICHOLAS S. RIZZO, *Examiner.*

UNITED STATES PATENT OFFICE

CERTIFICATE OF CORRECTION

Patent No. 3,236,852                               February 22, 1966

Luigi Bernardi et al.

It is hereby certified that error appears in the above numbered patent requiring correction and that the said Letters Patent should read as corrected below.

In the heading to the printed specification, line 9, for "150,652/62" read -- 15,065/62 --.

Signed and sealed this 24th day of January 1967.

(SEAL)
Attest:

ERNEST W. SWIDER                                      EDWARD J. BRENNER
Attesting Officer                                               Commissioner of Patents